United States Patent [19]
Hammer et al.

[11] 3,787,767
[45] Jan. 22, 1974

[54] DEFIBRILLATOR OUTPUT ENERGY MEASURING CIRCUIT

[75] Inventors: Leslie G. Hammer, Bristol; Charles A. Reynolds, Jr., New Haven, both of Conn.

[73] Assignee: Pioneer Medical Systems, Inc., New Britain, Conn.

[22] Filed: Oct. 15, 1971

[21] Appl. No.: 189,554

[52] U.S. Cl.............. 324/142, 324/158, 128/419 D
[51] Int. Cl............................................. G01r 21/00
[58] Field of Search..... 324/140, 142, 103 P, 158 F; 328/142, 143, 144, 146, 147, 26; 128/419 D

[56] References Cited
UNITED STATES PATENTS

| | | | |
|---|---|---|---|
| 3,694,748 | 9/1972 | Hekimian | 324/103 P |
| 3,614,637 | 10/1971 | Kubanoff | 328/26 |
| 3,461,386 | 8/1969 | McCutcheon et al. | 324/158 F |
| 2,979,663 | 4/1961 | Gill et al. | 324/103 P X |
| 2,970,261 | 1/1961 | Zoll | 324/140 R X |
| 3,226,641 | 12/1965 | Miller | 324/142 |
| 3,510,688 | 5/1970 | Andersson et al. | 324/103 R X |

*Primary Examiner*—Alfred E. Smith
*Attorney, Agent, or Firm*—John M. Prutzman et al.

[57] ABSTRACT

A universal portable analyzer for defibrillators giving a direct readout, in watt-seconds, of electrical energy pulses regardless of wave shape and polarity. A voltage divider input attenuates the signal and feeds it through gain and buffer stages.

A zero crossing detector gates switching networks for sequentially passing positive and negative signal components respectively to separate integrators which generate outputs proportional to the total positive and negative current of the input pulse. These outputs are stretched so that they occur simultaneously, are added together and squared to provide a signal porportional to power which is applied to a watt-second meter for direct readout. The solid state circuits include automatic ON-OFF control, and automatic zero reset at the beginning of each test cycle makes analyzer suited for use by non-technical personnel.

10 Claims, 12 Drawing Figures

PATENTED JAN 22 1974

INVENTORS
LESLIE G. HAMMER
CHARLES A. REYNOLDS, JR.

BY Vernon F. Kalb
ATTORNEY 3,787,767

DEFIBRILLATOR OUTPUT ENERGY MEASURING CIRCUIT

This invention relates to a universal fool-proof portable self-contained analyzer for automatically and precisely measuring the output energy of defibrillators or other generators of high electrical energy pulses regardless of wave shape or polarity of the pulses.

BACKGROUND OF THE INVENTION

The functioning of the human heart is controlled in a rhythmically synchronized manner by a master pacer within the heart which maintains its intrinsic rhythm through electrical signals conducted to the highly sensitive cell tissues of the heart. The central nervous system is connected by nerve fibers to the heart and also controls the pulse rate of the heart in accordance with the emotional and physical stimuli to which the body is subjected.

As a result of the physiological or pathological changes in the myocardium, the conductive system of the heart can be disturbed so that eventually the rhythmic contraction of the heart is lost and the master pacer no longer controls the heartbeat. Under such circumstances, the electrically conductive cells act out of control and the heart goes into fibrillation which is manifested in the very rapid and irregular contraction of the heart's muscular fibers. If a patient is suffering from left ventricular fibrillation of the heart, no blood is pumped and it is absolutely necessary that his heart be defibrillated immediately if he is to survive.

In order to successfully defibrillate the heart, it is first necessary to stop all uncontrolled fibrillation of the muscles. This can be accomplished manually, as by compressing the heart by hand for several seconds, mechanically, as by a high impact blow applied externally to the thoracic wall of the body, or electrically, as by a high energy electrical shock of short duration applied to the thoracic cavity. By choice, the electrical means of defibrillation is the more widely accepted technique because of the ease of application and the preciseness of the energy pulse which can be applied.

Typically an electrical energy impulse of up to 15 milli-second duration and having a minimum current level of 1 ampere and 400 watt-seconds energy is utilized because of the electrical resistance of the body cavity.

A variety of commercially available defibrillators are routinely utilized in hospital environments and pre-hospital emergency situations. Because of the emergency nature of their use, defibrillators are subjected to rough handling causing frequent malfunctioning. Improper operation may also result from the gradual deterioration of switch contacts, the aging of electrical insolation or the damage of storage capacitors and other components which have no visible outward signs and are not detectable by visual inspection.

Because of the possible fatal consequences of a failure of a defibrillator to deliver a sufficient level of pulse energy, or to deliver too much pulse energy, it is extremely important that all defibrillators be in top operating condition and tested periodically, preferably just prior to each use.

In the past, because of the complexity of the instrumentation required for such testing, it has been a major technical task to test a defibrillator and they were normally returned to a factory or major service center when their operation was thought to be in doubt.

The present invention overcomes this problem by providing a portable self-contained automatic analyzer for a defibrillator which can be operated by medical personnel having no special technical knowledge.

BRIEF DESCRIPTION OF THE DRAWINGS

FIG. 4a through i are graphical representations of the signals present at different stages of the analyzer.

DETAILED DESCRIPTION OF A PREFERRED EMBODIMENT

Figure 1:
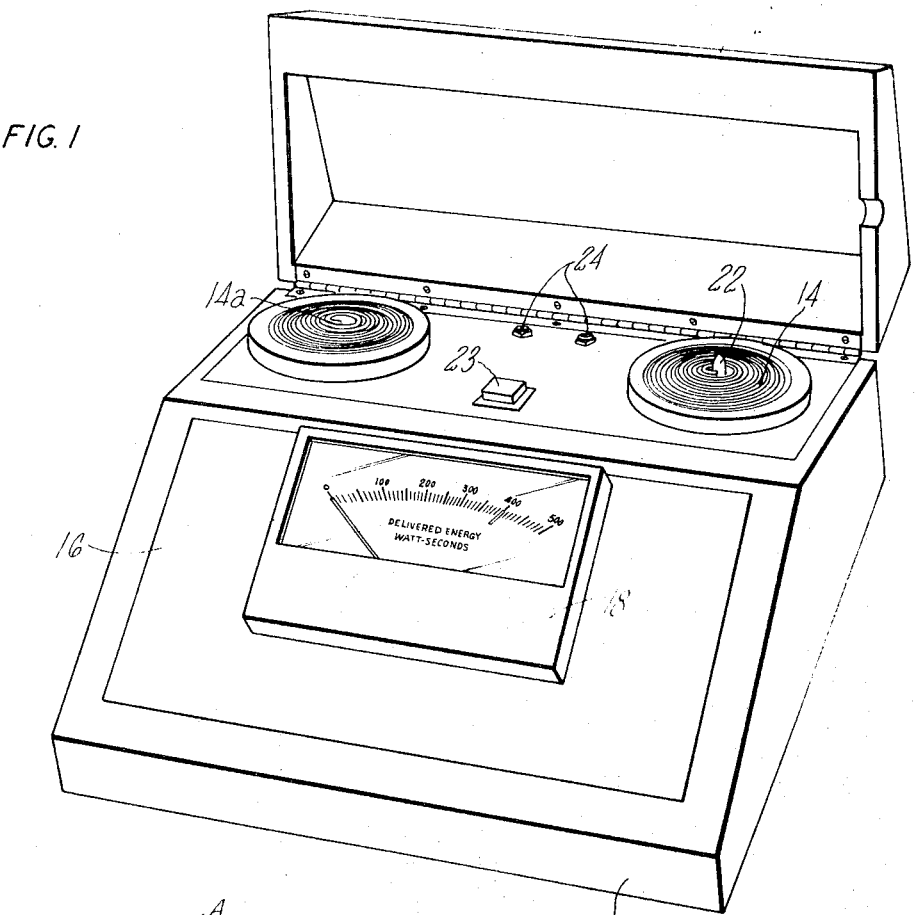
FIG. 1 is a perspective view of an exemplary portable defibrillator analyzer illustrative of this invention.
Figure 1:
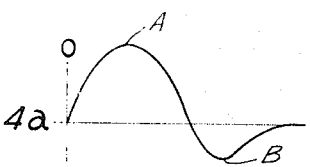
Figure 4A:
Figure 4A:
Figure 4A:
Figure 4A:
Figure 4A:
Figure 4A:
Figure 4A:
Figure 4A:

Referring to the drawings and particular to FIG. 1, there is disclosed an illustrative embodiment of a portable defibrillator analyzer illustrative of this invention.

As shown, the analyzer comprises a housing 10 suitable for table mounting and having a top storage cover 12 hinged thereto. The sloping front face 16 of the housing 10 mounts an energy readout meter which provides a visual energy readout of the energy level of the defibrillator being tested measured in watt-seconds. The meter 18 is preferably provided with a dial marker to mark the proper energy level of a correctly functioning defibrillator for easy reading when used under crises conditions.

A push button 23 for a test switch is provided for connecting a self-contained battery operated test signal circuit within the housing 10 to test the function of the analyzer and the calibration of the readout meter 18.

The meter is provided with a pair of input electrodes 14, 14a which are engaged by the output electrodes of a defibrillator being tested to connect it to the analyzer. Electrode 14 is provided with an automatically operated switch 22. Output jacks 24 are provided for an oscilloscope connection to observe the defibrillator pulse wave shape if desired.

When the output of a defibrillator being tested is applied to the electrodes 14, 14a is applied to attenuator 30 to reduce the amplitude of the signal to a level suitable for the circuitry of the analyzer. The output of the attenuator 30 is fed into a gain stage 34 which further corrects the signal strength to the desired level and is connected to a buffer 36 through an AC coupling which isolates the gain stage from the subsequent circuitry of the analyzer.

From the buffer 36, the signal is delivered to normally open switching network 38 and normally closed switching network 40 which are respectively gated to pass positive and negative excursions of the signal from buffer 36 by a zero crossing detector 42.

Any positive component of the pulse is passed by switching network 38 to an integrator 44. In like manner, the negative components of the pulse are passed by switching network 40 to integrator 46 by virtue of the operation of the zero crossing detector 42 which gates the switching network 40 to pass such negative signal components therethrough. The outputs of integrators 44 and 46 are respectively passed to pulse stretchers 48 and 50 which provide output signals which occur at the same instant of time so that they may be added by summer 52. The output of summer 52 is then applied at the input of a signal squaring network 54 to provide an output signal proportional to the power of the input signal.

This squared signal is in turn applied to readout meter 56 which provides a direct reading of the energy input of the pulse delivered by the defibrillator being tested in watt-seconds of energy.

Figure 2:
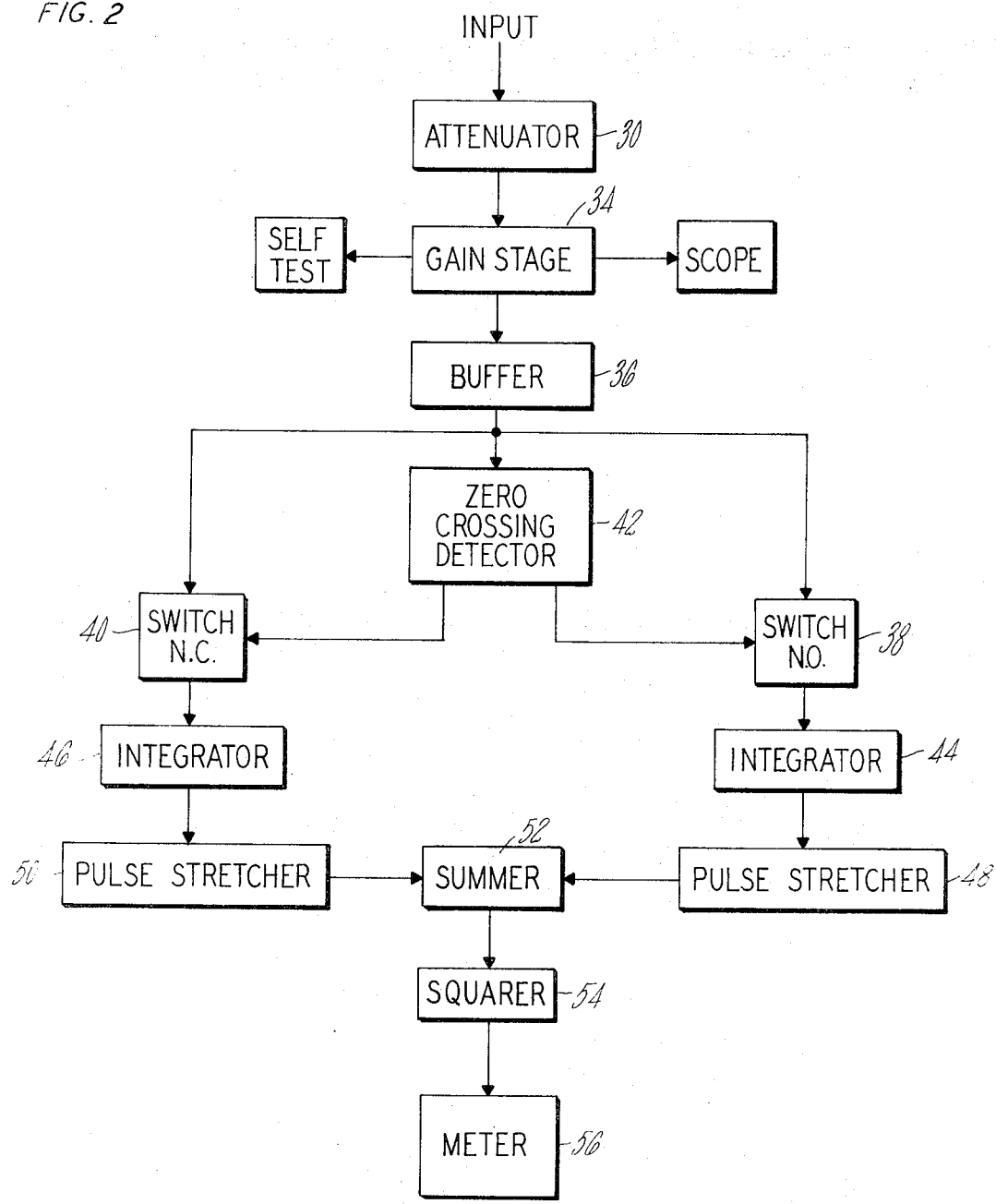
FIG. 2 is a block diagram of the circuitry of the defibrillator analyzer of FIG. 1.
Figure 3:
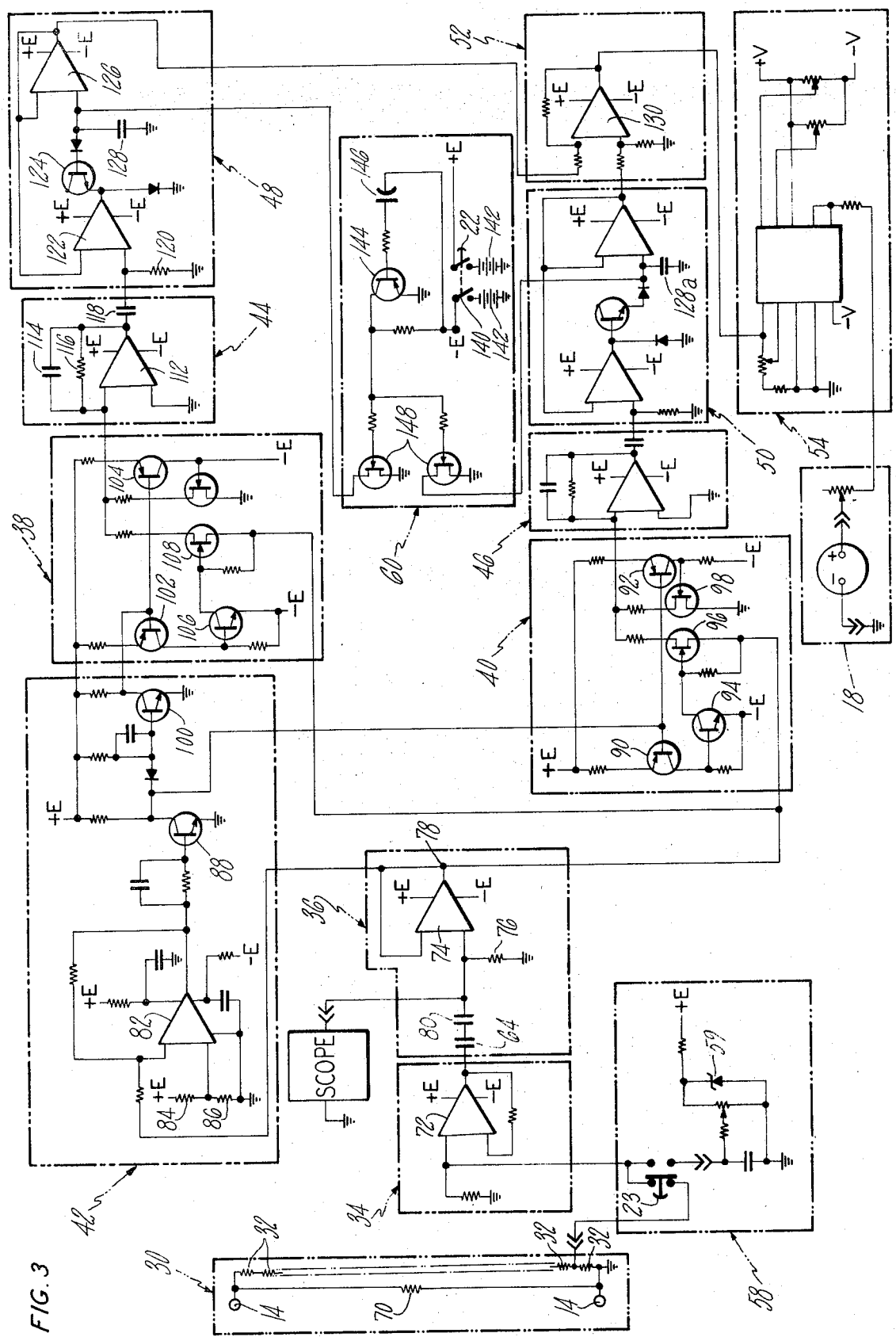
FIG. 3 is a circuit diagram thereof.

As indicated in FIGS. 2 and 3, the analyzer includes a source 58 for a self-contained battery-powered test reference signal which may be applied to the input of the gain stage 34 automatically by the actuation of push button 23 to verify that the analyzer is in operating condition and that the meter is correctly calibrated.

By virtue of the zero crossing detector 42 in the network it is apparent that the analyzer of this invention can be used to measure the output signal of a defibrillator whether it is AC or DC and regardless of the polarity in which the output electrodes of the defibrillator being tested are applied to the electrodes 14 of the test unit.

It is also apparent that by utilizing a switch for disconnecting the output signal from the buffer 36 from the zero crossing detector 42, or a switch for disconnecting the output signal from buffer 36 from switching network 38, the analyzer may be automatically conditioned for measuring only positive or negative excursions of the input pulse, respectively.

FIG. 4 illustrates the signals at the different stages of the analyzer in a circumstance wherein the input signal has positive and negative components. Such a signal is represented in FIG. 4a which has a large positive excursion followed by a small negative excursion represented by the lobes A and B respectively. FIG. 4b illustrates the output of the buffer 36 which has been reduced by the attenuator to a proportional amount of the input signal and has both positive and negative lobes from which the DC components have been removed by the AC coupling of buffer 36 to the gain stage 34.

Since the output of buffer 36 is initially positive, the zero crossing detector 42 conditions the normally open switching network 38 to pass the signal and conditions the normally closed switching network 40 to block the signal so that no pulse can pass through the normally closed switching network 40 as illustrated by FIG. 4d.

When the negative portion of the pulse appears at the output of the buffer 36, the zero crossing detector 42 allows the switching network 38 to assume its normally open position to block the passage of the signal and the switching network 40 to assume its normally closed position so that the negative components of the signal is passed.

As indicated by FIG. 4e., it will be observed that these signals from switching networks 38 and 40 occur sequentially and not simultaneously. The output of the positive pulse integrator 44 and the negative pulse integrator 46 are shown in FIGS. 4f and 4g, respectively and these pulses are stretched by pulse stretchers 48 and 50 respectively so that they are present simultaneously, as shown in FIGS. 4h and 4i, so that they may be applied to the input of the summer 52, added together, and passed to squarer 54 where the signal level is squarer to provide a signal proportioned to energy or power. The output of squares 54 is passed to the meter circuit to provide a direct readout in total watt-seconds of energy contained in a single pulse delivered by the defibrillator regardless of whether the excursion was positive or negative, or mixed.

Referring to FIG. 3, the attenuator 30 comprises a voltage divider connected in parallel with a resistor 70 capable of dissipating at least 400 watt-seconds output of the defibrillator being analyzed. Since the voltage at the discharge electrodes of the defibrillator is normally about 6,000 volts in order to produce an energy pulse of 400 watt-seconds at a current level of about 10 amperes in up to 15 milli-seconds the voltage divider is preferably formed of a plurality of resistors 32 connected in series so that the voltage developed across any resistor is minimized. The voltage developed across one of the resistors 32 and ground is delivered to the gain stage 34 having an operational amplifier 72 through a switch controlled by the push button 23.

The output of gain stage 34 is fed through coupling capacitor 64, which blocks the passage of any DC components, and is delivered to the buffer 36 which comprises another operational amplifier 74. The input terminal of operational amplifier 74 is connected to ground by a resistor to set a zero voltage at the output terminal 78 when no signal is applied to the input of the operational amplifier 74. Resistor 76 also forms with capacitors 64 and 80 a timing circuit to provide a time constant of sufficient duration, say, about 20 milliseconds, to accommodate the passage of any input pulses to be measured by the analyzer.

The output of the buffer 36 is delivered to zero voltage detector 42 which comprises a high speed voltage comparator 82 one input of which is maintained substantially at ground voltage by means of a voltage divider formed by resistors 84 and 86 so that the comparator 82 delivers a positive output signal when the signal from buffer 36 is positive. A positive output signal from comparator 82 causes the NPN transistor 88 to become conductive so that the collector thereof is essentially connected to ground. This turns on PNP transistors 90 and 94 of switching network 40. The conduction of transistor 90 turns on transistor 94 to turn off field effect transistor 96 to block the signal from buffer 36 from passing through switching network 40. The nonconduction of field effect transistor 96 also turns on field effect transistor 98 through transistor 92 to ground the input to integrator 46 to assure that there is no signal output from integrator 46.

When transistor 88 of zero crossing detector 42 is turned on, transistor 100 is turned off to bias the base of transistor 102 and of transistor 104 positively to turn them off. When transistor 102 is turned off, transistor 106 is also turned off to cause field effect transistor 108 to turn on to pass the positive signal from buffer 36.

With field effect transistor 108 conductive, the operational amplifier 112 of integrator 44 passes the positive signal delivered thereto and delivers an output signal which is proportional to the area of its input signal pulse.

Operational amplifier 112 is provided with a resistor 116 and a capacitor 114 which are connected in parallel and form a feedback loop having a time constant at least as great as the time constant for the timing circuit formed by capacitor 64 and 80 and resistor 76 and, say, of 25 milli-seconds, to insure that the operational amplifier 112 will integrate the entire signal delivered thereto.

The output signal of integrator 44 is inverted as shown in FIG. 4f and is fed into pulse stretcher 48 through a capacitor 118 which blocks any DC components in the output of integrator 44 and also forms with resistor 120 a timing circuit which provides for a signal duration much greater than the maximum input pulse duration from the defibrillator being tested.

The pulse stretcher 48 has a first operational amplifier 122 which receives the negative pulse from the integrator 44 and delivers an output signal to transistor 124 which is a very low leakage diode. The output signal of operational amplifier 122 is exactly the same level as its input signal, and by virtue of the low leakage characteristics of transistor 124, these signal levels are also equal to the input and output signal levels of the second operational amplifier 126. As a result, the capacitor 128 is charged to a level corresponding to the integrated output signal of integrator 44.

When the input pulse to the integrator 44 ceases, the output signal of the integrator becomes positive and the output of the operational amplifier 122 swings highly positive to turn off transistor 124 so that the charge on capacitor 128 develops the output voltage for the second operational amplifier 126 of the pulse stretcher 48.

This output signal is fed into summer 52 which comprises operational amplifier 130 where it is added to any output signal received from negative pulse integrator 46 and pulse stretcher 50 which, respectively, are similar to like circuit components 44 and 48. The output of summer 52 is fed into the squarer 44 to produce a signal which is the square of its input signal to give a measurement representative of the power of the input signal to the attenuator 30 from the defibrillator being tested. The signal is fed to meter 18 to provide a measurement of the power of the output signal of the defibrillator directly readable in watt-seconds.

A power supply 60 is battery powered to provide voltages above and below ground to meet the requirements of the various circuits. As indicated above in connection with FIG. 1, a push buttom 22 is automatically depressed when the analyzer is used to actuate a double pole switch 140 and connect the batteries 142 to the circuit automatically.

As shown in FIG. 3, the base of transistor 144 is connected to negative voltage through capacitor 146 to provide a short time delay to turn on transistor 144. The collector of transistor 144 is connected to field effect transistors 148 which are connected in the circuits of capacitors 128 and 128a to reset the meter to zero and prevent false readings during the short interval required for the circuit to stabilize following turn on.

The test circuit includes a zener diode 59 which serves to provide a voltage reference for testing the analyzer for functioning and the meter calibration as indicated above.

As will be apparent to persons skilled in the art, various modifications, adaptations and variations of the foregoing specific disclosure can be made without departing from the teachings of the present invention.

We claim:

1. An energy analyzer for providing a direct readout of the total pulsed energy delivered by a defibrillator or the like energy source during a single operation comprising a frequency insensitive input circuit for receiving the output energy delivered by said energy source and developing an input signal representative of the total unfiltered energy thereof, means for isolating the positive and negative components of said developed signal from each other, means for integrating any positive and negative components of the developed signal to generate a signal correlated with the magnitude of such positive and negative components, means responsive to said generated signal for providing a direct readout of the total unfiltered positive and negative energy delivered by said energy source during said single operation.

2. The analyzer of claim 1 wherein the isolating means includes gating switches and zero voltage detector for gating the switches for passing the positive and negative components selectively.

3. The analyzer of claim 2 wherein the zero voltage detector gates the switches for passing the positive and negative components sequentially.

4. The analyzer of claim 2 wherein the signal generating means includes means for squaring the generated signal.

5. The analyzer of claim 4 including means for automatically summing the signals corresponding to said positive and negative components.

6. The analyzer of claim 5 including means for stretching the signals corresponding to the positive and negative components prior to summing.

7. The analyzer of claim 1 including automatic means for turning the analyzer on and off at the beginning and end of each use thereof.

8. The analyzer of claim 7 including automatic means for resetting the analyzer to zero at the beginning of each use thereof.

9. The analyzer of claim 1 wherein said input circuit includes a timing circuit providing for the passage of the input signal for a period of time at least equal to the interval of delivery of the pulsed energy by the energy source during a single operation to enable the developed signal to represent the total energy output of said energy source during said single operation.

10. The analyzer of claim 6 wherein the signal stretching means includes a time delay circuit to insure that the positive and negative components delivered to the automatic summing means coexist for the full interval of delivery of pulsed energy by said energy source to said input circuit during a single operation.

* * * * *